No. 897,336. PATENTED SEPT. 1, 1908.
R. H. ANDERSON.
ROCK DRILL.
APPLICATION FILED FEB. 8, 1907.

WITNESSES:
Fred White
René P. Maine

INVENTOR.
Robert Hutchison Anderson
By his Attorneys
Arthur E. Fraser

UNITED STATES PATENT OFFICE.

ROBERT HUTCHISON ANDERSON, OF GERMISTON, TRANSVAAL.

ROCK-DRILL.

No. 897,336.　　　　　Specification of Letters Patent.　　　Patented Sept. 1, 1908.

Application filed February 6, 1907. Serial No. 355,982.

*To all whom it may concern:*

Be it known that I, ROBERT HUTCHISON ANDERSON, surveyor, of the May Consolidated Gold Mining Company Limited, of Germiston, in the Colony of the Transvaal, South Africa, have invented certain new and useful Improvements in and Relating to Rock-Drills, of which the following is a specification.

This invention relates to rock drills having a detachable head and has for its object to provide an improved form of head.

A head of a drill made in accordance with this invention is adapted to be attached to a shank by a tension member passing through the head and is provided with a cylindrical stem at the base of the head, a tapered hole through the head and three cutting edges unsymmetrically spaced, the outward extremities of the edges being in advance of the center of the head.

Figure 1:
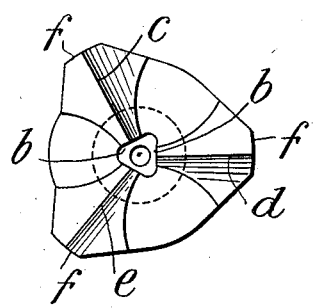
Figure 3:
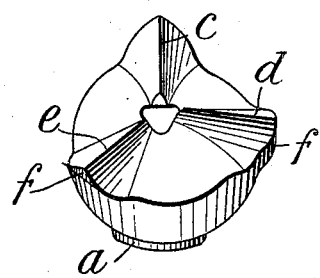
Figure 2:
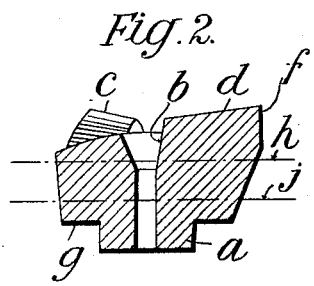
Figure 4:
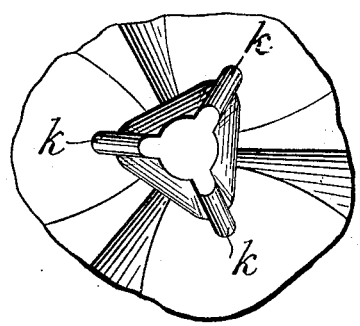

Referring to the drawings, Figure 1 is a plan of one form of drill head made in accordance with the invention, Fig. 2 is a sectional elevation thereof, Fig. 3 is a perspective view. Fig. 4 is a part plan to a larger scale showing the center of a drill head with grooves for water.

$a$ is a cylindrical stem, $b\,b$ are inclined faces forming a tapered mouth, preferably triangular in form with rounded corners, to a cylindrical hole centrally disposed in the head and stem.

$c\,d\,e$ are radial cutting edges unequally spaced, i. e., the distances between their outward extremities are unequal, the said extremities being in advance of the center of the drill.

$f f f$ are guiding faces which assist in keeping the course of the drill true and correct and these faces project slightly beyond the shank to provide sufficient clearance for the shank and for the crushed rock to escape as the hole is being drilled. The head is provided with a shoulder $g$ which is adapted to bear against a corresponding shoulder on the shank.

In use the features above described have many practical effects, for instance, the extremities of the cutting edges being in advance of the center, the circumference of the hole is dug out with precision while the center portion of the rock bursts inwards towards the central hole of the cutting head. In most cases the hole to be drilled is downwards, consequently the cuttings collect around the circumference of the hole by gravity and are in a position to escape easily up the side of the shank. A drill with three unsymmetrically spaced cutting edges cannot form a symmetrically grooved hole and consequently the defect known as rifling is avoided and a round hole obtained. Again, in starting a hole on a face inclined to the axis of the drill the rock is struck by one or two of the cutting edges at different places, said cuts extending over a range of more than one third of the circumference of the hole to be started.

Great advantages are obtained by placing a stem at the base of the head, for by this disposition of metal the head can be hardened so as to render the part above the dotted line $h$ uniformly hard and the part between the dotted lines $h$ and $j$ tough and the part below the dotted line $j$ soft; this is rendered possible by the mass of metal in the stem which is not immersed in the liquid when the head is chilled. Should the head be recessed to receive a stem in the shank the same beneficial results could not be obtained with economy.

The tapered hole in the head is an easy and efficient means of attachment, the tension member by which it is secured to the shank having a corresponding tapered head to fit into the hole, and said hole can be used for the passage of water to the face of the head, if provided with grooves $k$ therein.

I have found that a drill head with the outward extremities in advance of the center of the head does not wear away so quickly as when the extremities recede, and further the relative position of the bearing shoulder $g$ with the tension member and the extremity of the cutting edge gives great stability to the head; and there is little or no tendency of the head to rock on the shank.

What I claim and desire to secure by Letters Patent is:—

1. A detachable cutting head for rock drills, comprising a body portion having a flat base for engagement with a shank, cutting edges disposed upon the face of said body portion, and a stem centrally disposed on said base and forming therewith a rivetlike shaped structure and internally inclined faces in said head forming a hole centrally disposed therein, said inclined faces being provided with grooves, substantially as described.

2. A detachable cutting head for rock drills comprising a stem on the base of said head and internally inclined faces in said head, forming a hole centrally disposed therein said inclined faces being provided with grooves, substantially as set forth.

In witness whereof, I have hereunto signed my name in the presence of two subscribing witnesses.

ROBERT HUTCHISON ANDERSON.

Witnesses:
    HERBERT NEWBOULD,
    CLEMENT MUSTILL BRIGHT.